June 2, 1931.  A. P. ARMINGTON  1,808,445
TREAD LINK
Filed Sept. 21, 1928
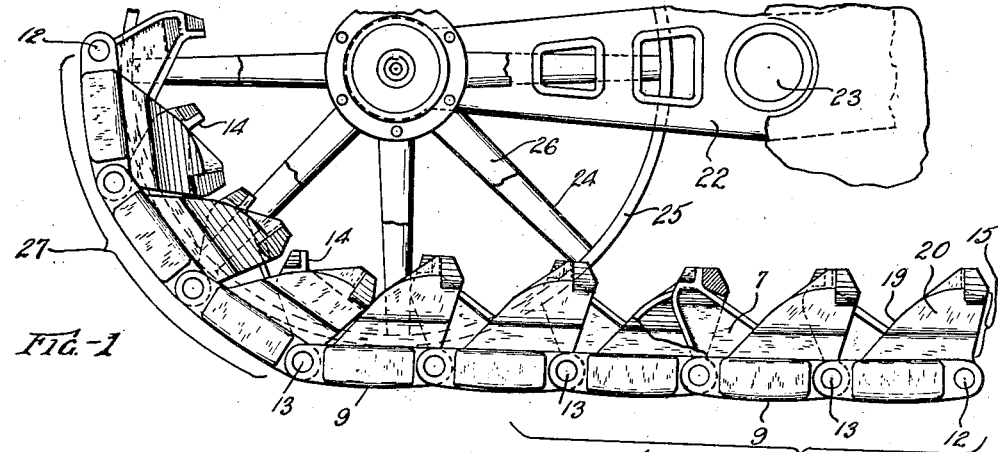
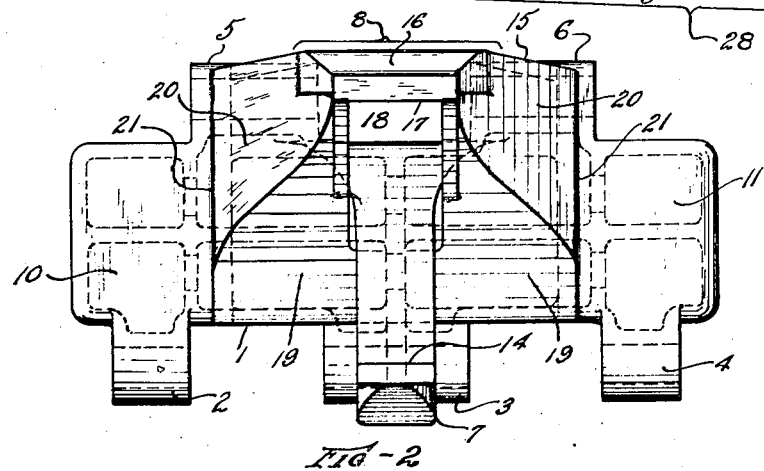
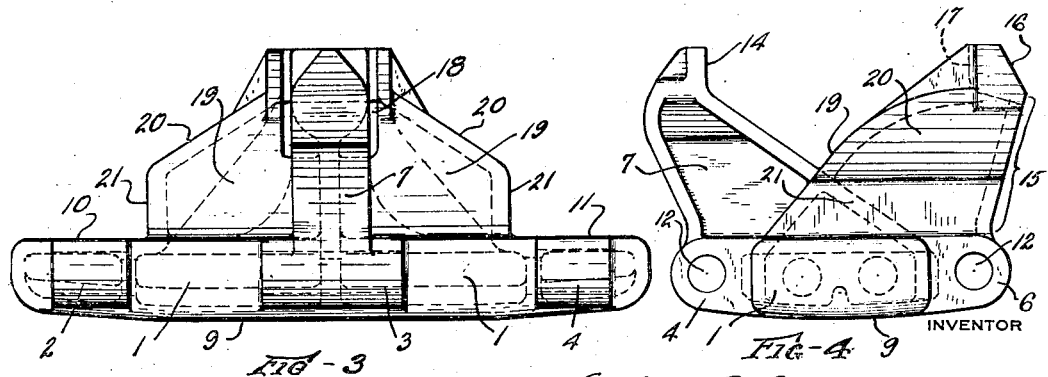
INVENTOR
BY Arthur P. Armington
Brockett, Hyde, Higley & Meyer
ATTORNEY Patented June 2, 1931

1,808,445

UNITED STATES PATENT OFFICE

ARTHUR P. ARMINGTON, OF WILLOUGHBY, OHIO, ASSIGNOR TO THE EUCLID CRANE & HOIST COMPANY, OF EUCLID, OHIO, A CORPORATION OF OHIO

TREAD LINK

Application filed September 21, 1928. Serial No. 307,358.

This invention relates to treads of the so-called creeper type adapted for service with heavy-duty load carrying vehicles. The treads to which reference is made are usually of endless type arranged to pass over the vehicle load-supporting wheels and adapted to function in the ground-engaging stretch between the wheels, as a beam; and comprising for the purpose a linkage the links of which have beam or tie forming portions upstanding from shoe portions.

The service conditions which such a tread must withstand are very severe. The tendency to wear is extreme and in most designs any appreciable wear of the interengaging parts seriously impairs the capacity of the tread to function in its stretches as a beam.

Further, in many instances the tread must be run over gravel and the like which has a tendency to work into and between the tread members with consequent liability of breakage of the parts, so that great strength is required.

Obviously the tread should be capable of functioning with the least friction.

It is the object of my invention to meet such requirements in such a tread to the greatest extent possible; and for the purpose and briefly I provide beam-forming portions of the linkage, characterized by hook and arch construction whereby the same function with hook and eye engagement; and that these parts may have the greatest strength I provide a novel arrangement thereof relative to the other parts of the links as will hereinafter appear.

The exact nature of my invention together with further objects and advantages thereof will be apparent from the following description taken in connection with the accompanying drawings in which Fig. 1 is an assembly view showing a portion of a tread illustrative of my invention and illustrating the various working positions of the links thereof as when arranged for employment with the vehicle parts indicated; Figs. 2, 3, and 4 are plan end and side views respectively of one of the links shown in Fig. 1.

With reference now to the drawings, the principal parts of the link are a shoe portion 1 having at its ends hinge portions 2—6, and generally upstanding from the tread portion a pair of beam-forming members namely, the hook 7, and the arch or wicket 8.

The shoe portion of the link is generally flat and rectangular and preferably of greater width than length, and may be hollow with the inner strengthening webbing indicated in broken lines. The shoe portion has a generally flat surface or face 9 adapted when the link is in ground-engaging position, which is that of Figs. 2, 3, and 4 of the drawings, to engage the ground as the lower extremity of the link. The hinge portions are conveniently in the form of hinge-pin receiving lugs projecting from the ends of the shoe portion in staggered relation as indicated; and while two, 5 and 6, are shown on one end and three, 2, 3, and 4 on the other end, a greater number may be employed if desired, although at least two (5 and 6) must be on one end and one (3) on the other end and therebetween and preferably centrally located on its ends as will later appear. Where hinge-pin receiving lugs are employed as illustrated, each lug has a transverse circular opening 12 to fit a hinge pin 13 and it will be appreciated that the openings 12 of all of the lugs on either end of the shoe portion are aligned to receive a single hinge pin. The upper surface of the shoe portion at its lateral extremities forms a pair of rails 10 and 11 as will appear and the corresponding end lugs 2 and 4 in alignment therewith are preferably formed with their upper surfaces in continuation thereof.

The hook member 7 is generally upstanding from the shoe portion of the link, and overhanging the hinge portion 3 thereof. The extremity of the hook member has a transverse face 14 generally in the plane of the opening 12 of the lug 3; and the base portion of the hook member is generally triangular extending along and joining with the shoe portion from the extremity of the hinge member 3 to the opposite end edge of the shoe portion between the hinge portions 5 and 6 thereof. Thus the longest possible connection between the hook member and the shoe portion is had and the hinge member 3 is greatly strengthened by the hook member. As shown, the base portion of the hook member is of H-section having at its fore and aft extremities transversely extending flanges and therebetween a longitudinally extending web, this web joining the part 9 of the shoe portion of the link. The upper extremity of the hook member 7 and particularly at the bend thereof is provided with the strengthening fillets indicated.

The arch 8 is formed of a pair of legs 15 generally upstanding from the shoe portion 1 and overhanging the hinge portions 5 and 6 thereof, the legs being joined across their extremities by a bridge 16 having a face 17 arranged generally in the plane of the openings 12 in the hinge portions 5 and 6. Each leg 15 is generally in the plane of one of the hinge portions 5 or 6 and has a long base joined with and extending along the shoe portion 1 from the extremity of its hinge portion 5 or 6 to the opposite end edge of the shoe portion; the arch 8 thus straddling the hook 7 with the clearance between the legs 15 and the bridge 16 forming an eye 18 opposite the extremity of the hook member. The legs 15 are generally hollow, their upper faces sloping as at 19 longitudinally of the link and as at 20 laterally of the link, the lateral extremities of the legs where they join the shoe portion being vertical to form flanges 21. Thus the hinge portions 5 and 6 of the link are strengthened by the legs 15 as is the hinge portion 3 strengthened by the hook 7. At the same time each leg 15 is strengthened by the bridge 16.

Fig. 1 shows a beam 22 mounted to swing upon an axle 23 and carrying on the end shown a pair of idler wheels, the far wheel having spokes 24 and rim 25, the spokes 26 of the near wheel being broken and the rim thereof removed. A length of tread linkage is shown having a portion 27 indicated as bent around the wheels and a stretch 28 extending from the wheels as to a similar pair of wheels not shown but mounted on the opposite extremity of the beam 22 all as will be appreciated by one familiar with the art. Each link of the tread is, as illustrated and described in detail with reference to Figs. 2–4, arranged in corresponding relation as to hook and arch portions and secured with its adjacent links by hinge pins 13; so that the hook of each link projects into the clearance 18 of the adjacent link and the arch of each link straddles the hook of its opposite adjacent link.

The rim of each wheel bears upon the track portions 10 and 11 of each link passing thereover; and the flange portions 21 of these links maintain the links against transverse motion on the wheels.

The beam-forming parts of the links are so proportioned and arranged that the faces 14 and 17 of each adjacent pair of links will when the tread linkage forms a stretch as at 28, engage with full bearing upon each other. Thus the tread stretch forms a beam against bending inwardly as between wheels on opposite ends of the beam 22, the shoe portions of the links between hinge pins forming in effect a continuous strut and the beam-forming upstanding link portions described forming in effect a continuous tie.

Likewise, as the tread bends around the wheels the beam-forming portions of the links owing to their described formation, collapse or telescope upon each other with ample clearance for the radius upon which the bend is made.

Where hard loose particles such as gravel are encountered, these will roll from the sloping faces 19 and 20 of the legs 15 and generally from and clear of the links so that my tread has a self-cleaning action in this respect. Further, although a pocket is in a sense formed by the hollow construction of the legs 15, as the tread bends about the wheels anything collected in these pockets will drop by gravity therefrom and thence by way of the faces 19 and 20 outward and clear of the tread.

It will be observed that as to the beam-forming portions of the links there are substantially no wearing parts, the faces 14 and 17 engaging merely with abutting characteristics; and any pounding or peening action, particularly upon the face 17 of the bridge 16, is resisted by the adjacent portions of the legs 15.

I have found my tread as described to be very exceptionally free running in operation as would be expected from the extreme simplicity of the nature of part interaction.

What I claim is:

1. A tread link for the purpose described and having a ground-engaging shoe portion and a pair of integral beam-forming members upstanding therefrom, one of said beam-forming members being arched and arranged in straddling relation with a base portion of the other beam-forming member.

2. A tread link for the purpose described and having a ground-engaging shoe portion and a pair of beam-forming members upstanding therefrom, the base portion of one of said beam-forming members joining said shoe portion substantially throughout its length along a longitudinally extending plane, said shoe portion having a hinge lug in said plane and joined with said base portion, the other beam-forming member being arched and arranged with its legs extending on opposite sides of a base portion of said first-named beam-forming member and there joined with said shoe portion.

3. A tread link of the class described having a ground-engaging shoe portion with hinge lugs extending from its ends, and beam-forming portions extending upwardly thereof and comprising oppositely disposed hook and arch members, whereby an endless tread may be formed of a number of said links connected by hinge pins and said tread may have bends and beam-forming stretches, the hook member having a centrally located base portion extending entirely along said shoe portion, and the arch member having base portions extending entirely along said shoe portion on either side of said hook member base portion.

In testimony whereof I hereby affix my signature.

ARTHUR P. ARMINGTON.